US010943876B2

(12) United States Patent
Marinet et al.

(10) Patent No.: US 10,943,876 B2
(45) Date of Patent: Mar. 9, 2021

(54) METHOD FOR DETECTING AN ATTACK BY MEANS OF A BEAM OF ELECTRICALLY CHARGED PARTICLES ON AN INTEGRATED CIRCUIT, AND CORRESPONDING INTEGRATED CIRCUIT

(71) Applicant: STMicroelectronics (Rousset) SAS, Rousset (FR)

(72) Inventors: Fabrice Marinet, Chateauneuf le Rouge (FR); Pascal Fornara, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 16/520,458

(22) Filed: Jul. 24, 2019

(65) Prior Publication Data

US 2020/0035624 A1    Jan. 30, 2020

(30) Foreign Application Priority Data

Jul. 30, 2018    (FR) ..................................... 1857057

(51) Int. Cl.
| | |
|---|---|
| *H01L 23/00* | (2006.01) |
| *H01L 23/48* | (2006.01) |
| *H01L 27/11521* | (2017.01) |
| *G11C 16/10* | (2006.01) |
| *G11C 16/14* | (2006.01) |

(52) U.S. Cl.
CPC ............ *H01L 23/576* (2013.01); *G11C 16/10* (2013.01); *G11C 16/14* (2013.01); *H01L 23/481* (2013.01); *H01L 27/11521* (2013.01)

(58) Field of Classification Search
CPC ................. H01L 23/576; H01L 23/481; H01L 27/11521; G11C 16/10; G11C 16/14
See application file for complete search history.

(56) References Cited

U.S. PATENT DOCUMENTS 6,856,581 B1 * 2/2005 Berstis .................... G04F 1/005
                                                    368/121
8,022,460 B2 * 9/2011 Yamazaki ........... H01L 29/7883
                                                    257/314

(Continued)

FOREIGN PATENT DOCUMENTS

| EP | 1293988 A2 | 3/2003 |
|---|---|---|
| EP | 1400887 A1 | 3/2004 |

(Continued)

OTHER PUBLICATIONS

INPI Search Report and Written Opinion for FR 1857057 dated Apr. 11, 2019 (8 pages).

*Primary Examiner* — Tri M Hoang
(74) *Attorney, Agent, or Firm* — Crowe & Dunlevy

(57) ABSTRACT

An attack on an integrated circuit using a beam of electrically charged particles is detected by collecting charges due to the attack using at least one electrically conductive body that is electrically coupled to the floating gate of a state transistor. Prior to the attack, the state transistor is configured to confer an initial threshold voltage. The collected charges passed to the floating gate cause a modification of the threshold voltage of the state transistor. Detection of the attack is made by determining that the threshold voltage of the state transistor is different from the initial threshold voltage.

25 Claims, 4 Drawing Sheets

(56) References Cited

U.S. PATENT DOCUMENTS

| | | | |
|---|---|---|---|
| 8,304,313 B2 * | 11/2012 | Tanaka | H01L 29/78621 |
| | | | 438/269 |
| 8,378,710 B1 | 2/2013 | Al-Kadi et al. | |
| 8,729,668 B2 | 5/2014 | Fornara et al. | |
| 9,025,373 B2 * | 5/2015 | Tatsumura | H01L 29/40117 |
| | | | 365/185.01 |
| 2005/0104161 A1 | 5/2005 | Matsuno | |
| 2005/0201158 A1 | 9/2005 | Rosa | |
| 2006/0028340 A1 | 2/2006 | Hooghan et al. | |
| 2006/0090211 A1 | 4/2006 | Stidl et al. | |
| 2013/0134499 A1 * | 5/2013 | Tatsumura | H01L 29/66833 |
| | | | 257/324 |
| 2013/0193437 A1 | 8/2013 | Lisart et al. | |
| 2013/0314121 A1 | 11/2013 | Mougin et al. | |
| 2014/0375303 A1 | 12/2014 | Helfmeier et al. | |
| 2016/0042199 A1 | 2/2016 | Joharapurkar et al. | |
| 2016/0328578 A1 * | 11/2016 | Plusquellic | G09C 1/00 |
| 2020/0035624 A1 | 1/2020 | Marinet et al. | |

FOREIGN PATENT DOCUMENTS

| | | |
|---|---|---|
| EP | 2680184 A1 | 1/2014 |
| FR | 2938953 A1 | 5/2010 |
| FR | 2985059 A1 | 6/2013 |

\* cited by examiner

METHOD FOR DETECTING AN ATTACK BY MEANS OF A BEAM OF ELECTRICALLY CHARGED PARTICLES ON AN INTEGRATED CIRCUIT, AND CORRESPONDING INTEGRATED CIRCUIT

PRIORITY CLAIM

This application claims the priority benefit of French Application for Patent No. 1857057, filed on Jul. 30, 2018, the content of which is hereby incorporated by reference in its entirety to the maximum extent allowable by law.

TECHNICAL FIELD

Embodiments and implementations relate to integrated circuits, in particular to devices for detecting a potential attempt to breach the integrity of the integrated circuit, for example through an attack by means of a projected beam of electrically charged particles.

BACKGROUND

In particular when reverse engineering an integrated circuit, techniques in which a beam of electrically charged particles is projected are typically implemented. The projected particles may be positively charged, such as positive ions in the case of a focused ion beam (FIB) or negatively charged, such as electrons in the context of scanning electron microscopy (SEM).

Integrated circuits in general, and in particular those provided with memories containing sensitive information, have to be protected to the greatest possible extent from attacks, in particular from attacks aiming to uncover stored data.

Data are retrieved after analyzing the architecture of the integrated circuit, generally by means of SEM, or by means of micrometer-scale machining of the integrated circuit in order to deposit measurement points thereon, which is generally achieved by means of FIB. These various operations are performed on the circuit when it is de-energized. It is therefore difficult for the same integrated circuit to detect and to preserve the trace of such techniques for observing or for modifying it, since it is not being supplied with power at the time of the attack.

However, preserving a trace of reverse engineering having been used on the de-energized integrated circuit would allow countermeasure devices to be triggered before any potential retrieval of data when the integrated circuit is supplied with power.

There are detection solutions based on an invisible polarizing element generating variations in current. However, these solutions are difficult to produce and to implement, are often incompatible with state-of-the-art technologies and have drawbacks such as current leakage, temperature-dependent instability and parasitic capacitive coupling, which may give rise to false positives.

It would of course be preferable for the elements for triggering countermeasures to be reliable and compatible with state-of-the-art technologies.

SUMMARY

To this end, what is proposed according to one aspect is a method for detecting an attack on an integrated circuit by means of a beam of electrically charged particles, comprising: an operation of producing, in the integrated circuit, at least one electrically conductive body and at least one state transistor having a floating gate that is electrically coupled with said at least one electrically conductive body, respectively; an operation of configuring said at least one state transistor so as to confer a respective initial threshold voltage thereon; and an operation of detecting said attack by detecting a threshold voltage of said at least one state transistor that is different from the initial threshold voltage.

Thus, during an attack by means of a beam of electrically charged particles on the integrated circuit, in particular in the context of scanning electron microscopy or of a focused ion beam, the charge will be collected by the electrically conductive bodies. The charges on the state transistor floating gates that are coupled to the electrically conductive bodies vary relative to the amount and to the polarization of the charges thus collected, and the threshold voltages of the state transistors vary correspondingly. By virtue of the floating gate transistors having a non-volatile memory function, this variation is stored lastingly and the information is easily accessible. Furthermore, the configuration of the initial threshold voltages of the state transistors allows the on or off state (or mode) of the state transistors to be reliably read according to the difference between the control voltage applied to the control gate of the state transistor and the initial threshold voltage thus set.

In other words, what is proposed according to this aspect is to preserve the trace of an attack on the integrated circuit by means of a beam of electrically charged particles, regardless of the polarization of said charge, in a way that is reliable and compatible with any floating gate non-volatile memory technology.

This or these state transistors may form part of dedicated memory cells, and the various initial threshold voltages of the state transistors may correspond to blank, wiped or programmed states of these state transistors and hence of the corresponding memory cells.

According to one implementation, the state transistor comprises a control gate and the operation of detecting the threshold voltage that is different from the initial threshold voltage comprises an operation of generating at least one control voltage on the control gate that is different from said initial threshold voltage, and an operation of determining, for each control voltage, an on or off state of said at least one state transistor. The on or off state is understood to refer to the state in which the amount of current that is able to flow through the transistor is higher or lower, respectively, than a reference current. Thus, said determination operation may comprise an operation of comparing a current on the conduction terminals of said at least one state transistor with a reference current.

According to one implementation, said production operation comprises an operation of producing a first state transistor and a second state transistor; said configuration operation comprises an operation of wiping the first state transistor so as to confer a first initial threshold voltage thereon and an operation of programming the second state transistor so as to confer a second initial threshold voltage thereon; and said detection operation comprises an operation of detecting a modification to the threshold voltage of one of the two state transistors with respect to the corresponding initial threshold voltage thereof.

On the one hand, since the state transistors are wiped and programmed, respectively, during the configuration of the integrated circuit, their respective initial threshold voltages are kept well under control, and reading is made more reliable thereby.

On the other hand, an attempt to evade detection, for example by placing the electrically conductive body at a given potential in order to reconfigure the charges on the floating gates, such as a potential simulating a wiped or programmed state of the state transistors, will be detected upon reading the transistor that was initially configured to the other state.

Furthermore, a single control voltage allows both transistors to be read, for example in one implementation in which said detection operation comprises an operation of applying, to each state transistor, a control voltage that is located between the first initial threshold voltage and the second initial threshold voltage.

According to another implementation, said configuration operation comprises an operation of connecting said at least one body to a ground potential using a connecting element during the operation of producing the integrated circuit, followed by an operation of cutting through the connecting element so as to confer, on said at least one state transistor, a third initial threshold voltage corresponding to a blank configuration of this state transistor.

This implementation corresponds to placing the state transistor in a strictly blank state, i.e. a state that is neither programmed nor wiped, without undergoing the coupling and parasitic charge alterations that typically take place during integrated circuit fabrication processes up to the point when the wafers are singulated. This also has the advantage of avoiding the wiping and programming steps when configuring the transistors.

For example, said detection operation may comprise an operation of applying a first control voltage that is lower than the third initial threshold voltage of the transistor, and a second control voltage that is higher than the third initial threshold voltage of the transistor.

According to another implementation, said configuration operation comprises an operation of wiping or of programming said at least one state transistor so as to confer either a first initial threshold voltage, corresponding to said wiping operation, or a second initial threshold voltage, corresponding to said programming operation, thereon.

For example, said detection operation may comprise either an operation of applying a first control voltage that is lower than the first initial threshold voltage and a second control voltage that is higher than the first initial threshold voltage or an operation of applying a third control voltage that is lower than the second initial threshold voltage and a fourth control voltage that is higher than the second initial threshold voltage.

In other words, this makes it possible to detect a variation in the threshold voltage with respect to the initial threshold voltage resulting either from a positively charged beam or from a negatively charged beam.

Advantageously, each control voltage is furthermore different from a threshold voltage of a state transistor having a blank configuration.

This makes it possible to thwart an attempt to evade detection by placing the electrically conductive body at a ground potential in order to reconfigure the charges in the floating gates.

According to an embodiment, said operation of producing, in the integrated circuit, at least one electrically conductive body comprises an operation of producing at least one metal plate located in interconnect levels of the integrated circuit.

According to an embodiment, said operation of producing, in the integrated circuit, at least one electrically conductive body comprises an operation of producing at least one trench filled with a conductive material extending vertically in depth in a semiconductor substrate of the integrated circuit.

According to another aspect, what is proposed is an integrated circuit including a device for detecting an attack by means of a beam of electrically charged particles, comprising: at least one electrically conductive body and at least one state transistor having a floating gate that is electrically coupled with said at least one electrically conductive body, respectively, said at least one state transistor being configured to have a respective initial threshold voltage; and a detection circuit that is configured to detect said attack by detecting a threshold voltage of said at least one state transistor that is different from the initial threshold voltage.

According to one embodiment, the state transistor includes a control gate, and the detection circuit comprises a read circuit that is configured to generate at least one control voltage on the control gate of said state transistor that is different from said initial threshold voltage, and, for each control voltage, to determine an on or off state of said at least one state transistor.

According to one embodiment, said at least one state transistor comprises a first state transistor that is wiped so as to have a first initial threshold voltage and a second state transistor that is programmed so as to have a second initial threshold voltage, and said detection circuit is configured to detect a modification to the threshold voltage of one of the two state transistors with respect to the corresponding initial threshold voltage thereof.

The read circuit may be configured to generate a control voltage on each state transistor, which voltage is located between the first initial threshold voltage and the second initial threshold voltage.

According to another embodiment, said at least one state transistor is configured to have a third initial threshold voltage corresponding to a blank configuration of this state transistor.

The read circuit may be configured to generate a first control voltage that is lower than the third initial threshold voltage and a second control voltage that is higher than the third initial threshold voltage.

According to another embodiment, said at least one state transistor is either wiped so as to have a first initial threshold voltage or programmed so as to have a second initial threshold voltage.

The read circuit may be configured to generate at least one control voltage comprising either a first control voltage that is lower than the first initial threshold voltage and a second control voltage that is higher than the first initial threshold voltage or a third control voltage that is lower than the second initial threshold voltage and a fourth control voltage that is higher than the second initial threshold voltage.

According to one embodiment, the read circuit is configured to generate each control voltage so that it is furthermore different from a threshold voltage of a state transistor having a blank configuration.

According to one embodiment, a capacitive element is furthermore coupled between the floating gate and the control gate of said at least one state transistor.

The capacitive element makes it possible to compensate for a modification to the coupling factor between the floating gate and the control gate resulting from the electrically conductive body being coupled to the floating gate. Thus, the reading of the state transistors may be controlled using typical voltages that are kept under control, improving the reliability of the detection device.

According to one embodiment, said at least one electrically conductive body comprises at least one a metal plate that is located in interconnect levels of the integrated circuit.

A plate provides the advantage of being able to collect a substantial amount of electric charge.

According to an embodiment, said at least one electrically conductive body comprises at least one trench filled with conductive material extending vertically in depth in a semiconductor substrate of the integrated circuit.

BRIEF DESCRIPTION OF THE DRAWINGS

Other advantages and features of the invention will become apparent on examining the detailed description of wholly non-limiting embodiments and modes of implementation, and the appended drawings in which:

FIG. 6 shows an example implementing a configuration of a state transistor; and.

DETAILED DESCRIPTION

Figure 1:
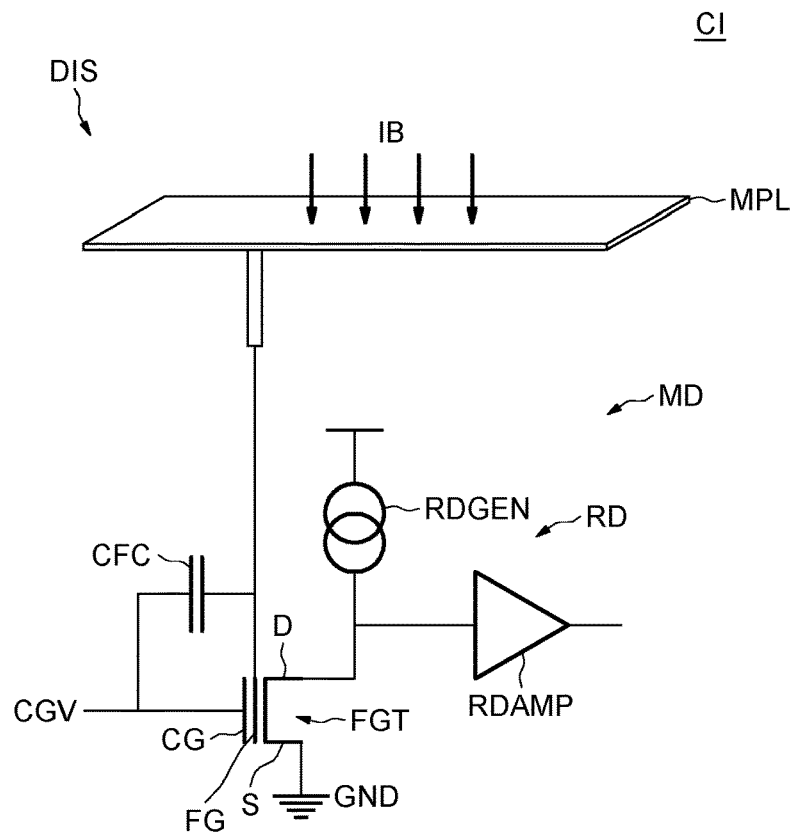
FIG. 1 shows an example of one embodiment of an integrated circuit.

FIG. 1 shows an example of one embodiment of an integrated circuit CI including a device DIS for detecting an attack by means of a beam IB of electrically charged particles.

The device DIS comprises an electrically conductive body MPL, in this example a metal plate. For example, the metal plate MPL is produced in the interconnect levels of the integrated circuit CI, which levels are generally referred to by the acronym BEOL for back end of line.

The electrically conductive body MPL may also include, in combination or alternatively, a trench filled with a conductive material extending vertically in depth in a semiconductor substrate of the integrated circuit CI, for example as described below in relation to FIGS. 7 and 8.

The device DIS comprises at least one state transistor FGT having a control gate CG and a floating gate FG, and a source region S and a drain region D. Only one state transistor FGT has been shown for the sake of simplicity. The design of the state transistor FGT is for example the same as a state transistor belonging to a non-volatile memory portion of the integrated circuit CI. The state transistor FGT may even belong to a memory cell having the same design as in a non-volatile memory, i.e. including for example an access transistor. The terms "programmed state" and "wiped state" of the state transistor correspond to the respective write states of a memory cell, in the terminology of the field of non-volatile memory.

That being so, the floating gate FG of the state transistor FGT of the detection device DIS is coupled to the electrically conductive body MPL.

The state transistor FGT is configured to have an initial threshold voltage. The threshold voltage is the voltage applied between the control voltage CGV node at the control gate CG and the source S of the transistor FGT at which a transition of the state transistor FGT from an off mode to an on mode takes place. The threshold voltage to which the state transistor FGT is initially configured is qualified as an "initial" voltage because, as will become apparent hereinafter, the actual threshold voltage of the state transistor FGT may be made to vary with respect to this initial threshold voltage.

As described in detail below, in particular with reference to FIGS. 3, 4 and 5, the state transistor FGT may be in three different states, for example in a first, wiped state in which the floating gate is positively charged, in a second, programmed state in which the floating gate is negatively charged, and in a third state, referred to as the blank state, in which the floating gate is at a ground potential.

Each state of the state transistor FGT, namely the wiped, programmed, or blank state, characterizes a respective value of the initial threshold voltage of the state transistor FGT.

However, in the detection device DIS, an attack by means of a beam IB of electrically charged particles on the metal plate MPL will result in a buildup of charge on this plate, and hence a modification to the charge of the floating gates FG that are coupled thereto.

This positive or negative charge modification will result in a corresponding variation in the actual threshold voltage of the state transistor FGT and hence potentially modify the off or on mode for a given control voltage CGV.

The term (on or off) "mode" is interchangeable with the term (on or off) "state". Of course, the off or on state for a given control voltage is to be distinguished from the wiped or programmed state of the transistor.

The detection device DIS thus includes a detection circuit MD that is configured to detect such a variation that is representative of an attack by means of a beam of charged particles on the integrated circuit CI.

The detection circuit MD includes a read circuit RD that is configured to generate at least one control voltage CGV on the control gate CG of the state transistor FGT, and to read an on or off mode of the state transistor FGT controlled by this control voltage CGV. At the control voltage CGV, the state transistor FGT may be in linear mode, and the operation of determining the on or off state of the transistor FGT corresponds to an operation of comparing the amount of current passed by the state transistor FGT with respect to a reference current. Simplistically, it is assumed that an amount of current passed by the state transistor FGT that is lower than the reference current is representative of an off state, and an amount of current passed by the state transistor FGT that is higher than the reference current is representative of an on state.

The control voltage CGV is generated conventionally by a generator circuit (not shown). In this example, the mode in which the transistor FGT finds itself in response to the control voltage CGV is read by the read circuit which comprises a read current generator RDGEN and a read amplifier RDAMP. The read current generator RDGEN is configured to precharge an input node of the read amplifier RDAMP, which is also coupled to the drain D of the state transistor FGT. The source S of the state transistor FGT is coupled to a ground terminal GND.

Thus, for a given control voltage CGV, if the control voltage CGV is higher than the actual threshold voltage of the transistor FGT, the transistor FGT is in the on mode. In the on mode, an amount of current that may be higher than the read current can flow through the conduction terminals of the transistor FGT to ground GND and the voltage at the input of the read amplifier RDAMP drops. If the control voltage CGV is lower than the actual threshold voltage of the transistor FGT, the transistor FGT is in the off mode. In the off mode, the voltage at the input of the read amplifier RDAMP does not vary, or does not vary enough to make the read amplifier RDAMP switch. The output of the read amplifier RDAMP thus delivers a signal that is representative of the mode of the state transistor FGT at a given control voltage CGV. This output signal can be used for downstream processing, for example an operation of comparing the output signal with an expected value of this signal in a given configuration.

In other words, the read circuit RD makes it possible to evaluate the value of the actual threshold voltage of the state transistor FGT. Thus, if it is evaluated that the actual threshold voltage of the state transistor FGT is different from the respective initial threshold voltage, then the charge on the floating gate FG has varied, which is indicative of an attack by means of a beam of electrically charged particles on the integrated circuit CI.

Figure 2:
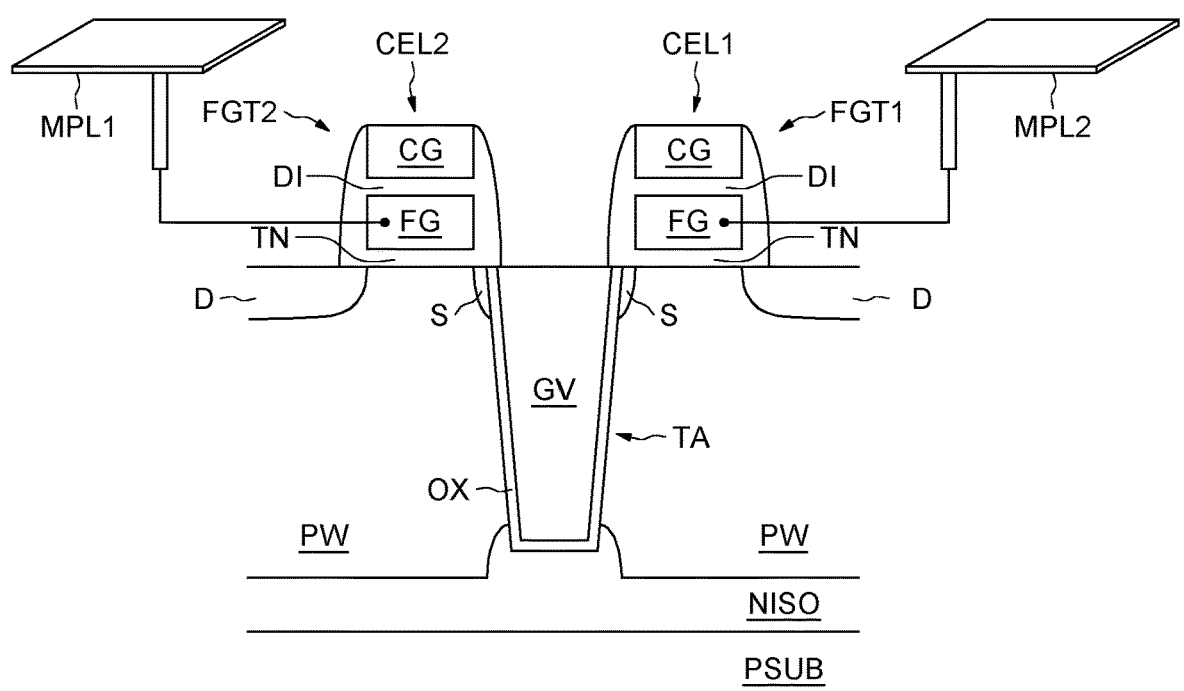
FIG. 2 shows an example of one embodiment of a pair of state-of-the-art memory cells.

FIG. 2 shows an example of one embodiment of a pair of state-of-the-art memory cells CEL1, CEL2, formed on a semiconductor substrate PSUB.

Each memory cell includes one state transistor FGT1, FGT2, sharing a common access transistor TA.

The state transistors FGT1, FGT2 each include a control gate CG surmounting a floating gate FG, which are separated from one another by a silicon ONO (oxide-nitride-oxide) dielectric layer DI. The control gates CG and the floating gates FG are typically formed of electrically conductive polycrystalline silicon. A low-thickness tunnel oxide TN separates the floating gate FG from a channel region that is located between the source S and drain D regions of each transistor FGT1, FGT2, in a well PW.

The access transistor TA is a buried transistor and includes a vertical gate GV passing through the well PW down to a buried semiconductor layer NISO. The vertical gate GV, also made of polycrystalline silicon, is enveloped in a gate oxide OX. The buried layer NISO acts as the source region of the access transistor TA, and the two source regions S of the two state transistors FGT1, FGT2, on either side of the vertical gate GV, act as the drain regions of the access transistor TA.

The floating gate FG of each of the state transistors FGT1, FGT2 is coupled to a respective electrically conductive body MPL1, MPL2 and forms part of the device DIS for detecting an attack by means of a beam of electrically charged particles IB. The access transistor TA may also belong to the detection device DIS, and be controlled adequately by the read circuit RD.

According to one embodiment, the two state transistors belong to the detection device DIS; the first state transistor FGT1 is wiped to have a first initial threshold voltage and the second state transistor FGT2 is programmed to have a second initial threshold voltage. For this, reference is made to FIG. 3.

Figure 3:
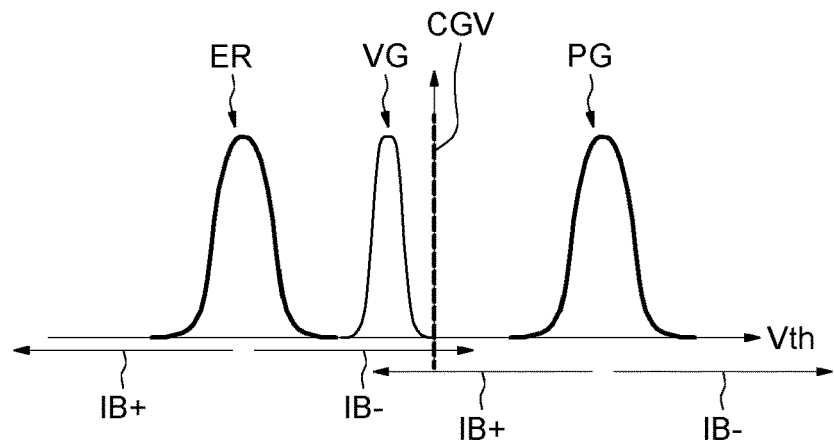
FIGS. 3, 4 and 5 relate to three different states of the state transistor.
Figure 4:
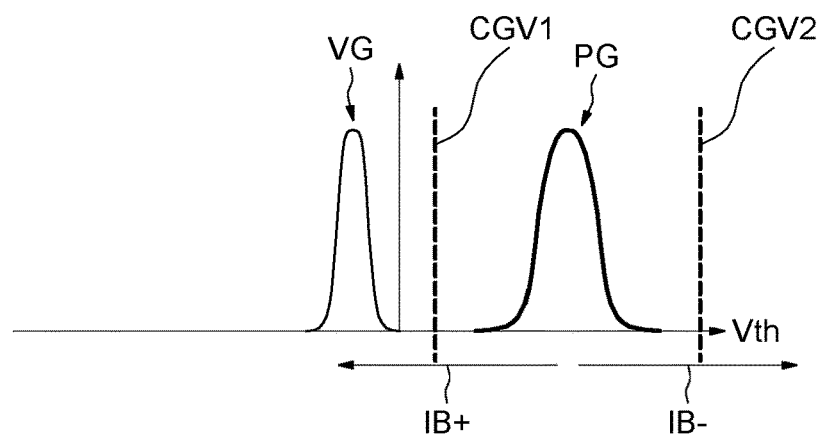
Figure 5:
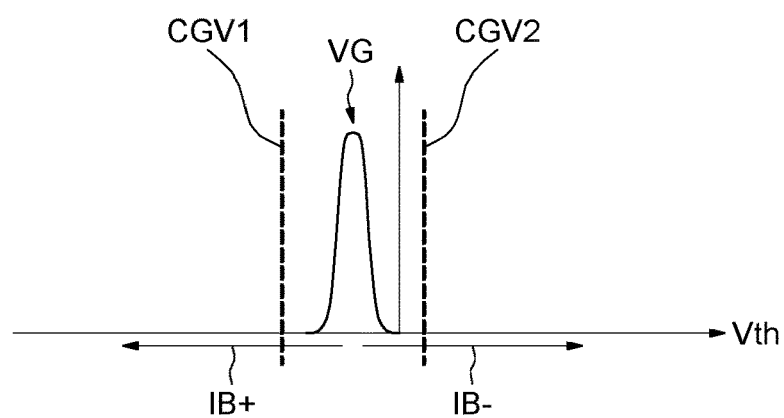

FIGS. 3, 4 and 5 show normal distributions of the values Vth of the transistor threshold voltages in wiped ER, programmed PG and blank VG states, respectively. Thus, the term "initial threshold voltage" should be understood, relative to a given state, as any threshold voltage value Vth that is substantially within the respective distribution (for example the density values that are higher than 1% of the maximum density).

FIG. 3 thus shows the initial threshold value ER of a first, wiped state transistor FGT1, and the initial threshold value PG of a second, programmed state transistor FGT2. Furthermore, the initial threshold voltage VG of a state transistor whose floating gate is set at a ground potential is also shown.

The control voltage CGV generated by the read circuit RD when reading an on or off mode of each of the two state transistors FGT1, FGT2 is located between the first initial threshold voltage ER and the second initial threshold voltage PG.

If the integrated circuit has not been subjected to an attack by means of a beam of electrically charged particles, then the actual threshold voltages of the state transistors FGT1, FGT2 are equal to the initial threshold voltages ER, PG.

Thus, during the read operation, the first, wiped state transistor FGT1 is in an on mode at the control voltage CGV, and the second, programmed state transistor FGT2 is in an off mode at the same control voltage CGV.

Now, a positively charged particle beam IB+ projected onto the conductive bodies MPL1, MPL2 would have the effect of decreasing the actual threshold voltages Vth of the state transistors FGT1, FGT2, which would thus be represented by the curves in FIG. 3 that are shifted to the left.

Consequently, during a subsequent read operation, the first state transistor FGT1 is still in an on mode at the control voltage CGV, while the second, programmed state transistor FGT2 is now in an on mode at the same control voltage CGV. Since the second, programmed state transistor FGT2 was expected to be in off mode at this control voltage CGV, the attack by a positively charged particle beam is detected.

Analogously, a negatively charged particle beam IB− projected onto the conductive body MPL1, MPL2 would have the effect of increasing the actual threshold voltages Vth of the state transistors FGT1, FGT2, which would be represented by the curves in FIG. 3 that are shifted to the right.

During a subsequent read operation, the first state transistor FGT1 has switched to an off mode at the control voltage CGV, while the second, programmed state transistor FGT2 has stayed in an off mode at the same control voltage CGV. Since the first, wiped state transistor FGT1 was expected to be in on mode at this control voltage CGV, the attack by a negatively charged particle beam is detected.

Furthermore, it will be noted that the control voltage CGV is also different from a threshold voltage VG of a state transistor whose floating gate is set at a ground potential. Thus, if the floating gates of the transistors FGT1, FGT2 are reconfigured to have a blank state, the reconfiguration will be detected in an analogous manner. Such a reconfiguration operation could be implemented with a view to removing the traces resulting from the projection of the beam of electrically charged particles, for example by applying a ground potential to the metal plate. Furthermore, if the transistors FGT1, FGT2 are reconfigured to have wiped or programmed states via the application of suitable potentials to the electrically conductive bodies MPL1, MPL2, the reconfiguration operation will be detected in an analogous manner by the change of state of one of the two transistors FGT1, FGT2.

FIG. 4 shows one embodiment in which a state transistor FGT is programmed to have a second initial threshold voltage PG.

The state transistor FGT could equally have been wiped to have a second initial threshold voltage ER.

Furthermore, it is also possible to envisage, in this embodiment, a plurality of floating gate transistors FGT that are individually configured arbitrarily to have wiped or programmed states.

Here, a first control voltage CGV1, lower than the initial threshold voltage PG of the transistor FGT, is generated for a first operation of reading the on or off mode of the state transistor FGT.

A second control voltage CGV2, higher than the initial threshold voltage PG of the transistor FGT, is generated for a second operation of reading the on or off mode of the state transistor FGT.

In this example, the state transistor FGT is configured to be off during the first operation of reading the first control voltage CGV1, and to be on during the second operation of reading the second control voltage CGV2.

An attack by means of a positively charged IB+ or negatively charged IB− particle beam will be detected during the first read operation (on mode instead of the expected off mode) and during the second read operation (off mode instead of the expected on mode), respectively.

The control voltages CGV1, CGV2 are furthermore different from an initial threshold voltage VG of a state transistor whose floating gate is set at a ground potential, so as to be able to detect a reconfiguration to a blank state.

FIG. 5 shows one implementation in which a state transistor FGT is configured to have a third initial threshold voltage VG, corresponding to a blank state.

An attack by means of a positively charged IB+ or negatively charged IB− particle beam is detected in a manner analogous to the implementation described above with reference to FIG. 4, i.e. by means of a first read operation at a first control voltage CGV1 that is lower than the third initial threshold voltage VG and a second read operation at a second control voltage CGV2 that is higher than the third initial threshold voltage VG.

An on mode instead of the expected off mode during the first read operation and an off mode instead of the expected on mode during the second read operation will allow an attack by means of a positively charged IB+ or negatively charged IB− particle beam, respectively, or else an attempt to reconfigure the state transistor FGT to have a wiped or programmed state, respectively, to be detected.

This implementation requires a prior configuration of the state transistor FGT comprising the floating gate FG being set at a ground potential. The floating gate is set at a ground potential via a connecting element LI during the fabrication of the integrated circuit CI. At the end of the fabrication line, for example when the integrated circuits CI are cut from a silicon wafer, the connecting element LI is severed. This allows the state transistor FGT to be configured to have a third initial threshold voltage VG, corresponding here to a threshold voltage of a transistor in the blank state, despite the parasitic electrical interactions of the other steps in the fabrication of an integrated circuit CI, which may build up charge on the floating gate FG.

Figure 6:
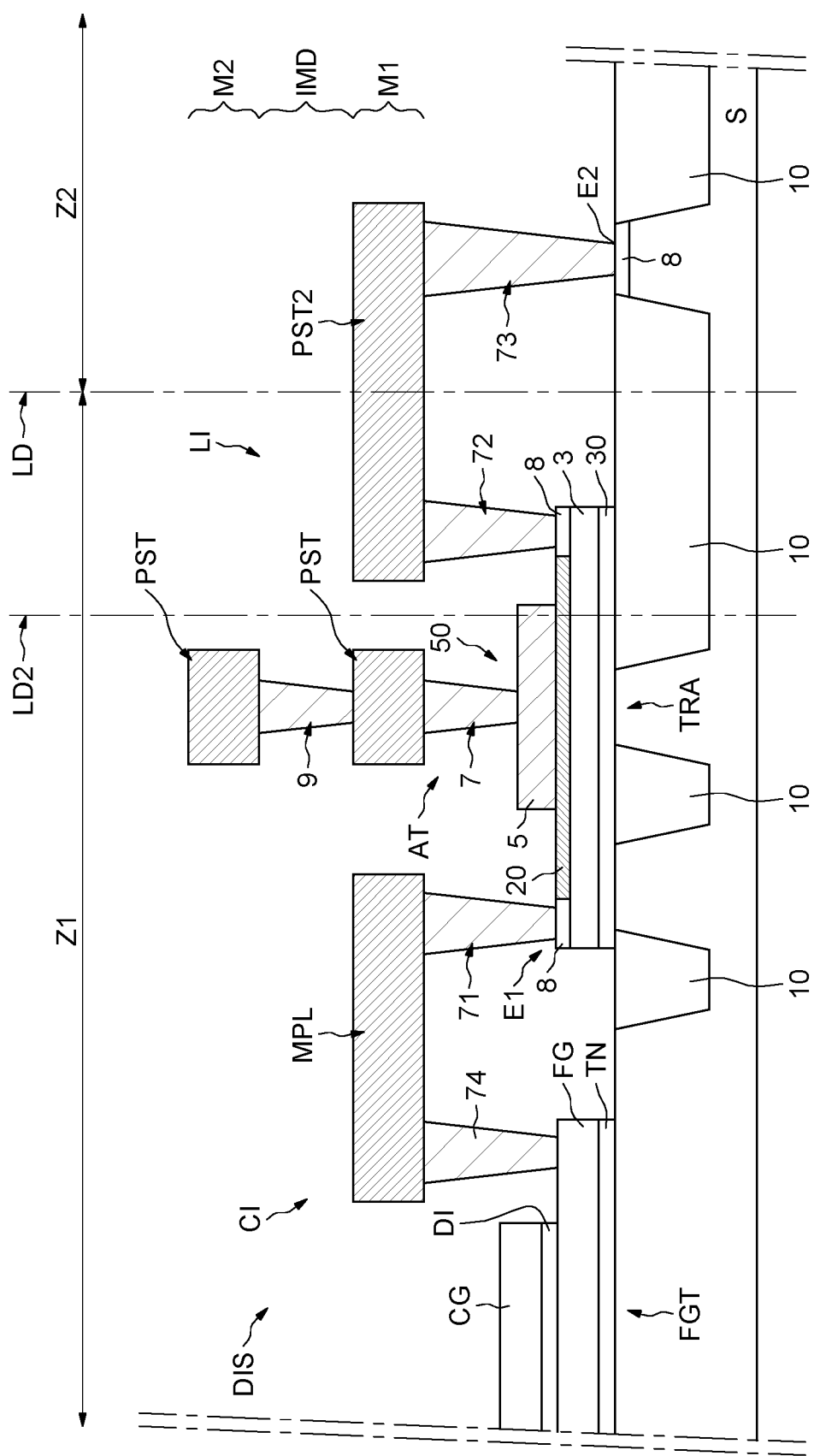

FIG. 6 shows an example of a circuit structure for implementing such a configuration of a state transistor FGT to have a third initial threshold voltage VG corresponding to a threshold voltage of a transistor in the blank state.

The integrated circuit CI is located in a first zone Z1 of a semiconductor wafer which is separated from a second zone Z2 of the wafer by a cutting path LD.

The wafer is intended to be cut mechanically along the cutting path LD so as to singulate the produced integrated circuits CI, for example for them to be conditioned and encapsulated in functional packages.

The substrate S of the wafer and of the integrated circuit comprises lateral isolating regions 10, for example shallow trench isolations (STIs).

The circuit CI comprises, on its outer periphery, a sealing ring AT. This structure is advantageous because it provides sealtightness and hence allows the integrated circuit CI to be protected from the potential propagation of chips and splinters when cutting the wafer to allow the integrated circuits to be singulated.

Of course, the integrated circuit CI may comprise several sealing rings AT on its periphery, these being arranged side-by-side so as to bolster sealtightness and better protect the integrated circuit CI.

The sealing ring AT is produced in the first levels of an interconnect portion (BEOL) of the integrated circuit CI. The interconnect portion includes metallization levels M1, M2, which are electrically separated by respective intermetal dielectric layers IMD. The intermetal dielectric layers IMD may have conductive vias 9 passing therethrough in order to electrically connect metal tracks PST belonging to various metallization levels. Below the first metallization level M1, contacts 7 allow the elements formed in and on the substrate S to be connected.

The sealing ring AT includes a superposition of metal tracks PST and vias 9 on top of a first contact 7, all extending longitudinally so as to form a structure akin to a wall.

The contact 7 of the sealing ring AT rests on a first polycrystalline silicon bar 5, resting on a first dielectric layer 20.

A second polycrystalline silicon bar 3 extends laterally on either side of the sealing ring AT, below the first bar 5 and the first dielectric layer 20, and is separated from the substrate S by a second dielectric layer 30.

Thus, the second polycrystalline silicon bar 3 allows an electrical connection to be provided between the inside and the outside of the sealing ring AT, for example by means of contacts 8 at its ends. The contacts 8 are generally formed by silicidation and allow couplings exhibiting little resistance to be provided between a metal and the silicon.

The structure TRA thus crossing the sealing ring AT constitutes a portion of an electrically conductive connecting element LI that extends outside the integrated circuit CI, beyond the cutting line LD.

The electrically conductive connecting element LI extends between a first site E1 inside the integrated circuit CI and a second site E2 located outside the integrated circuit CI, in this case a site on the substrate that is located in zone Z2 of the wafer beyond the cutting line LD.

The first site E1 is the node at which the electrically conductive body MPL is coupled with the second silicon bar 3 via a contact 71 on the silicided end 8 within said bar 3. In this example, the electrically conductive body comprises a metal plate MPL in the first metallization level M1.

The metal plate MPL is electrically coupled to the floating gate FG of at least one state transistor FGT. For this, in this representation, the floating gate FG extends beyond the control gate CG in terms of width. On the portion of the floating gate FG thus exposed, a contact 74 electrically connects the floating gate FG to the metal plate MPL.

For example, the floating gate FG and the control gate CG may form gates that are common to multiple embodiments of neighboring state transistors FGT, which can be selected independently by their respective source and drain regions (these not being shown as they are located in planes parallel to that of the depiction of FIG. 6).

Thus, the metal plate MPL and the floating gates FG of the state transistors FGT are electrically connected to the second site E2 via the connecting element LI.

The connecting element LI also comprises a straddling portion that crosses the cutting line LD. The straddling portion comprises a metal track PST2 that is located for example in the first metallization level M1, and two contacts 72, 73 connecting the second polycrystalline silicon bar 3 and the second site E2, respectively.

The second site E2 is located here at a contact in the substrate S outside the integrated circuit CI, which is not subject to the parasitic electrical interactions of the fabrication of the integrated circuit CI.

The substrate S is kept grounded during fabrication, and thus the floating gates FG and the electrically conductive body MPL are also kept at a ground potential during the fabrication of the integrated circuit CI.

The straddling portion PST2 of the connecting element LI will next be severed in the cutting operation, leaving the potentials of the electrically conductive body MPL and of the floating gates FG floating at an initial ground potential. Consequently, the state transistors FGT are configured, in this implementation, to be in a strictly blank state so as to have a third initial threshold voltage VG.

According to one alternative, the connecting element LI may be severed when cutting along another cutting path LD2. The other cutting path LD2 is located at the superposition of the first polycrystalline silicon bar 3 and of the second polycrystalline silicon bar 5, between the sealing ring AT and the contact 8 outside the integrated circuit CI. This alternative may allow access to the device DIS to be made more complex, it being more difficult to make contact on the polysilicon bars 3 or 5 than on the metal track PST2.

The example of a connecting element LI has been described according to one advantageous embodiment, but of course other configurations of the connecting element LI are possible, for example without necessarily passing under the sealing ring.

Figure 8:
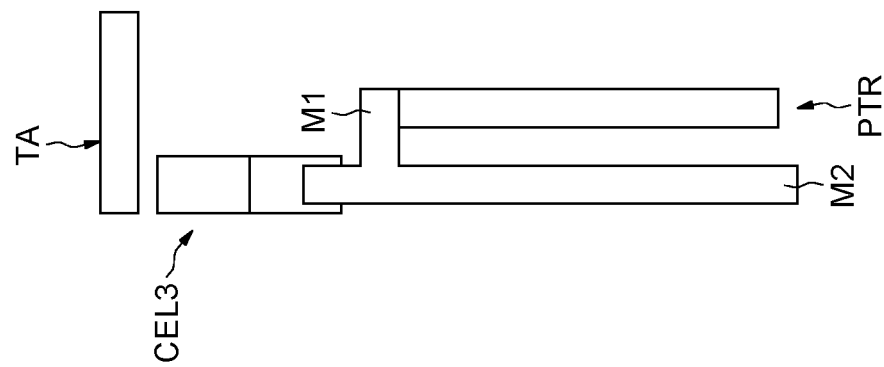
FIGS. 7 and 8 illustrate an example of one embodiment of an integrated circuit.
Figure 7:
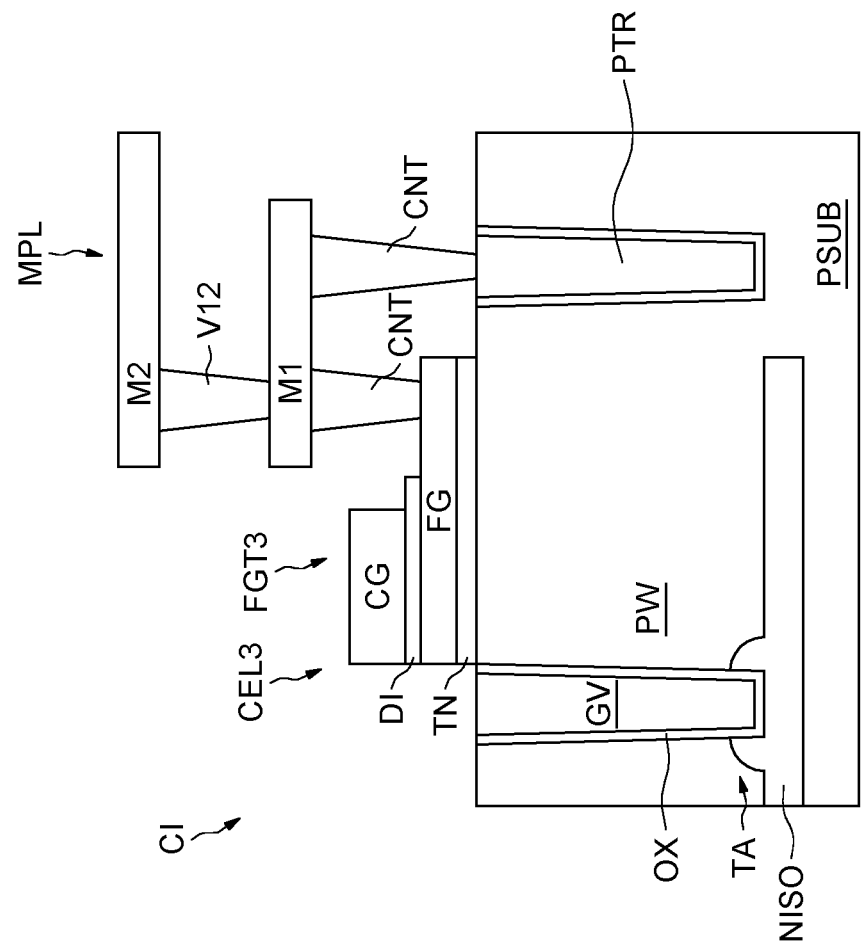

FIGS. 7 and 8 illustrate an example of an integrated circuit IC with a device DIS for detecting an attack using a beam of electrically charged particles.

FIG. 7 and FIG. 8 are respectively a cross-sectional view and a top view of a memory cell CEL3, which is of the same design as the memory cells CEL1, CEL2 previously described in relation to FIG. 2 and/or FIG. 6.

The common elements support the same references and are not detailed again here.

Thus, the CEL3 memory cell includes in particular a state transistor FGT3 having a floating gate FG and a control gate CG, and a buried access transistor TA having a vertical gate GV.

The floating gate FG of the state transistor FGT3 is coupled to an electrically conductive body MPL of the device DIS for detecting an attack using a charged particle beam IB (FIG. 1).

In this embodiment, the electrically conductive body MPL comprises at least one trench filled with a conductive material PTR extending vertically in depth in a PSUB semiconductor substrate of the integrated circuit CI.

For example, in the manufacturing process of the integrated circuit CI, the production of the trench filled with a conductive material PTR is implemented simultaneously with the production of the access transistor TA.

However, the buried semiconductor layer NISO acting as the source region of the access transistors TA is not useful for the function of the electrically conductive body MPL formed by the trench filled with a conductive material PTR.

Thus, the buried semiconductor layer NISO may or may not be present at the bottom of the trench filled with a conductive material PTR, for example depending on where it is located and whether or not such a buried semiconductor layer NISO is provided at that location.

Of course, the electrically conductive body MPL can also include in combination metal plates MPL1, MPL2 as described above in relation to FIGS. 1, 2, and 6.

In the embodiment of FIGS. 7 and 8, the trench filled with a conductive material PTR is electrically coupled to the floating gate FG of the state transistor FGT3 via metal lines M1, M2, contacts CNT and via V12 of the interconnect levels.

The metal lines M1, M2 of the interconnect levels can at the same time form the metal plates MPL1, MPL2 intended to be charged by the electrically charged particle beam.

Advantageously, the trench filled with a conductive material PTR is designed to cover a maximized surface of the substrate (on top view, the depth in the substrate being fixed by the manufacturing process), depending on the possibilities allowed by the other integrated circuit elements formed in and on the same substrate.

For example, the trench filled with a conductive material PTR can be located at a distance from the state transistor FGT3 and coupled to its floating gate by a path in the interconnect levels.

Thus, in the case of etching using a beam of charged particles, such as FIB (Focalized Ion Beam) etching, applied from the back of the PSUB substrate and directed towards the front face of the substrate (on which the FGT3 state transistor is made), may encounter the trench filled with a conductive material PTR of the DIS detection device at the moment when the level of the bottom of the well PW is reached by the etching.

Thus, the charges of the charged particle beam will polarize the electrically conductive body and modify the charge of the floating gate of the state transistor FGT3, similar to the etching through the interconnect levels and charging the metal plates previously described in relation to FIGS. 1 and 2.

A variation in the threshold voltage of the state transistor FGT3 can thus be measured using a technique as described above in relation to FIGS. 3 to 6.

In summary, examples of implementations and embodiments allowing the trace of an attack on the integrated circuit, potentially while it is de-energized, by means of a beam of electrically charged particles to be preserved regardless of the polarization of said charge and in a manner that is reliable and compatible with any type of technology have been described. Furthermore, the described implementations and embodiments are resistant to attempts to evade detection, in particular to attempts to reconfigure the charges on the floating gates.

The invention claimed is:

1. A method for detecting an attack on an integrated circuit by use of a beam of electrically charged particles, comprising:

configuring at least one state transistor within the integrated circuit so as to confer the at least one state transistor to have a respective initial threshold voltage before said attack;

collecting, through at least one electrically conductive body that is electrically coupled to a floating gate of said at least one state transistor, electric charges in response to said attack; and detecting said attack by detecting a threshold voltage of said at least one state transistor due to the collected electric charges that is different from the initial threshold voltage.

2. The method according to claim 1, wherein the at least one state transistor comprises a control gate and wherein detecting the threshold voltage that is different from the initial threshold voltage comprises:
  applying at least one control voltage on the control gate that is different from said initial threshold voltage; and
  determining, for each applied control voltage, an on or off state of said at least one state transistor, the determined on or off state providing an indication of whether said attack has occurred.

3. The method according to claim 1, wherein configuring the at least one state transistor comprises:
  configuring a first state transistor and a second state transistor;
  wiping the first state transistor so as to confer a first initial threshold voltage; and
  programming the second state transistor so as to confer a second initial threshold voltage; and
  wherein detecting comprises detecting modification to the threshold voltage of at least one of the first and second state transistors with respect to the corresponding first and second initial threshold voltages.

4. The method according to claim 3, wherein detecting comprises applying, to control gates of each of the first and second state transistors, a control voltage that is located between the first initial threshold voltage and the second initial threshold voltage.

5. The method according to claim 1, wherein configuring comprises:
  connecting said at least one electrically conductive body to a ground potential through a connecting element during a producing of the integrated circuit; and
  cutting through the connecting element so as to confer, on said at least one state transistor, the initial threshold voltage corresponding to a blank configuration of the at least one state transistor.

6. The method according to claim 5, wherein the at least one state transistor comprises a control gate and wherein detecting the threshold voltage that is different from the initial threshold voltage comprises:
  applying at least one control voltage on the control gate that is different from said initial threshold voltage; and
  determining, for each applied control voltage, an on or off state of said at least one state transistor, the determined on or off state providing an indication of whether said attack has occurred.

7. The method according to claim 6, wherein applying comprises applying a first control voltage that is lower than the initial threshold voltage and applying a second control voltage that is higher than the initial threshold voltage.

8. The method according to claim 1, wherein configuring comprises one of wiping or programming said at least one state transistor so as to confer either a first initial threshold voltage corresponding to said wiping or a second initial threshold voltage corresponding to said programming.

9. The method according to claim 8, wherein the at least one state transistor comprises a control gate and wherein detecting the threshold voltage that is different from the initial threshold voltage comprises:
  applying at least one control voltage on the control gate that is different from said initial threshold voltage; and
  determining, for each applied control voltage, an on or off state of said at least one state transistor, the determined on or off state providing an indication of whether said attack has occurred.

10. The method according to claim 9, wherein applying comprises one of:
  applying a first control voltage that is lower than the first initial threshold voltage and a second control voltage that is higher than the first initial threshold voltage; or
  applying a third control voltage that is lower than the second initial threshold voltage and a fourth control voltage that is higher than the second initial threshold voltage.

11. The method according to claim 2, wherein the at least one control voltage is different from a threshold voltage of the at least one state transistor having a blank configuration.

12. The method according to claim 1, further comprising producing said at least one electrically conductive body by producing at least one metal plate located in interconnect levels of the integrated circuit.

13. The method according to claim 1, further comprising producing said at least one electrically conductive body by producing at least one trench filled with a conductive material extending vertically in depth in a semiconductor substrate of the integrated circuit.

14. An integrated circuit, comprising:
  at least one electrically conductive body configured to collected electric charges in response to an attack by use of a beam of electrically charged particles;
  at least one state transistor having a floating gate that is electrically coupled with said at least one electrically conductive body, respectively, said at least one state transistor being configured to have a respective initial threshold voltage before said attack; and
  a detection circuit configured to detect said attack by detecting a threshold voltage of said at least one state transistor that is different from the initial threshold voltage.

15. The integrated circuit according to claim 14, wherein the at least one state transistor includes a control gate, and the detection circuit comprises a read circuit configured to determine an on or off state of said at least one state transistor in response to application of at least one control voltage on the control gate of said at least one state transistor that is different from said initial threshold voltage.

16. The integrated circuit according to claim 15, wherein said at least one state transistor comprises:
  a first state transistor that is wiped so as to have a first initial threshold voltage; and
  a second state transistor that is programmed so as to have a second initial threshold voltage; and
  wherein said detection circuit is configured to detect a modification to the threshold voltage of at least one of the first and second state transistors with respect to the corresponding first and second initial threshold voltages.

17. The integrated circuit according to claim 16, wherein the at least one control voltage is between the first initial threshold voltage and the second initial threshold voltage.

18. The integrated circuit according to claim 14, wherein the initial threshold voltage corresponds to a blank configuration of the at least one state transistor.

19. The integrated circuit according to claim 18, wherein the at least one state transistor includes a control gate, and the detection circuit comprises a read circuit configured to determine an on or off state of said at least one state transistor in response to application of at least one control voltage on the control gate of said at least one state transistor that is different from said initial threshold voltage, and wherein said at least one control voltage comprises a first control voltage that is lower than the initial threshold voltage and a second control voltage that is higher than the initial threshold voltage.

20. The integrated circuit according to claim 14, wherein said at least one state transistor is one of wiped so as to have a first initial threshold voltage or programmed so as to have a second initial threshold voltage.

21. The integrated circuit according to claim 20, wherein the at least one state transistor includes a control gate, and the detection circuit comprises a read circuit configured to determine an on or off state of said at least one state transistor in response to application of at least one control voltage on the control gate of said at least one state transistor that is different from said initial threshold voltage, and
   wherein the at least one control voltage comprises one of:
      a first control voltage that is lower than the first initial threshold voltage and a second control voltage that is higher than the first initial threshold voltage; or
      a third control voltage that is lower than the second initial threshold voltage and a fourth control voltage that is higher than the second initial threshold voltage.

22. The integrated circuit according to claim 14, wherein the at least one state transistor includes a control gate, and the detection circuit comprises a read circuit configured to determine an on or off state of said at least one state transistor in response to application of at least one control voltage on the control gate of said at least one state transistor that is different from said initial threshold voltage, and wherein the at least one control voltage is different from a threshold voltage of the at least one state transistor having a blank configuration.

23. The integrated circuit according to claim 14, further comprising a capacitive element coupled between the floating gate and a control gate of said at least one state transistor.

24. The integrated circuit according to claim 14, wherein said at least one electrically conductive body comprises a metal plate that is located in interconnect levels of the integrated circuit.

25. The integrated circuit according to claim 14, wherein said at least one electrically conductive body comprises at least one trench filled with conductive material extending vertically in depth in a semiconductor substrate of the integrated circuit.

* * * * *